Figure 1:
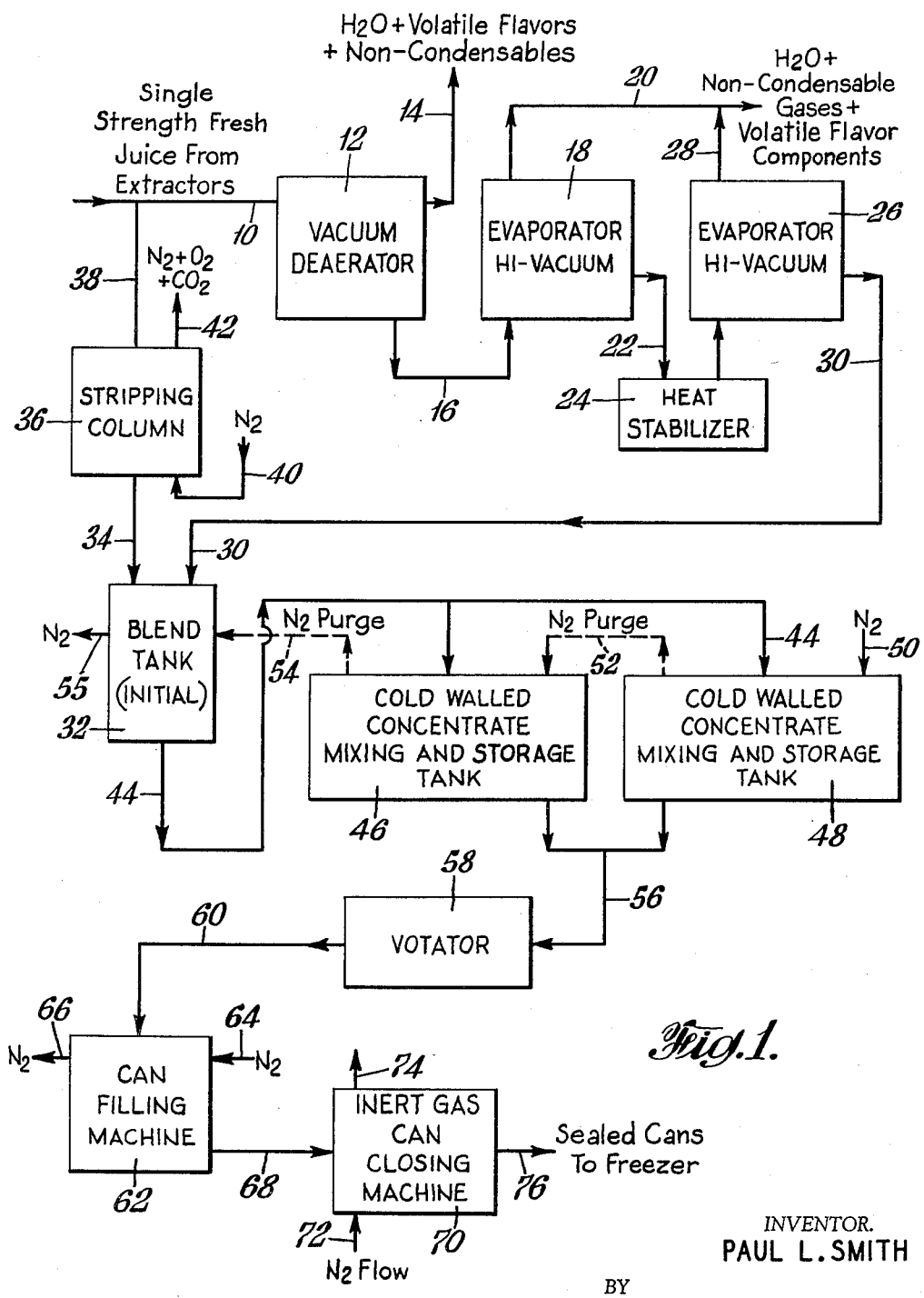

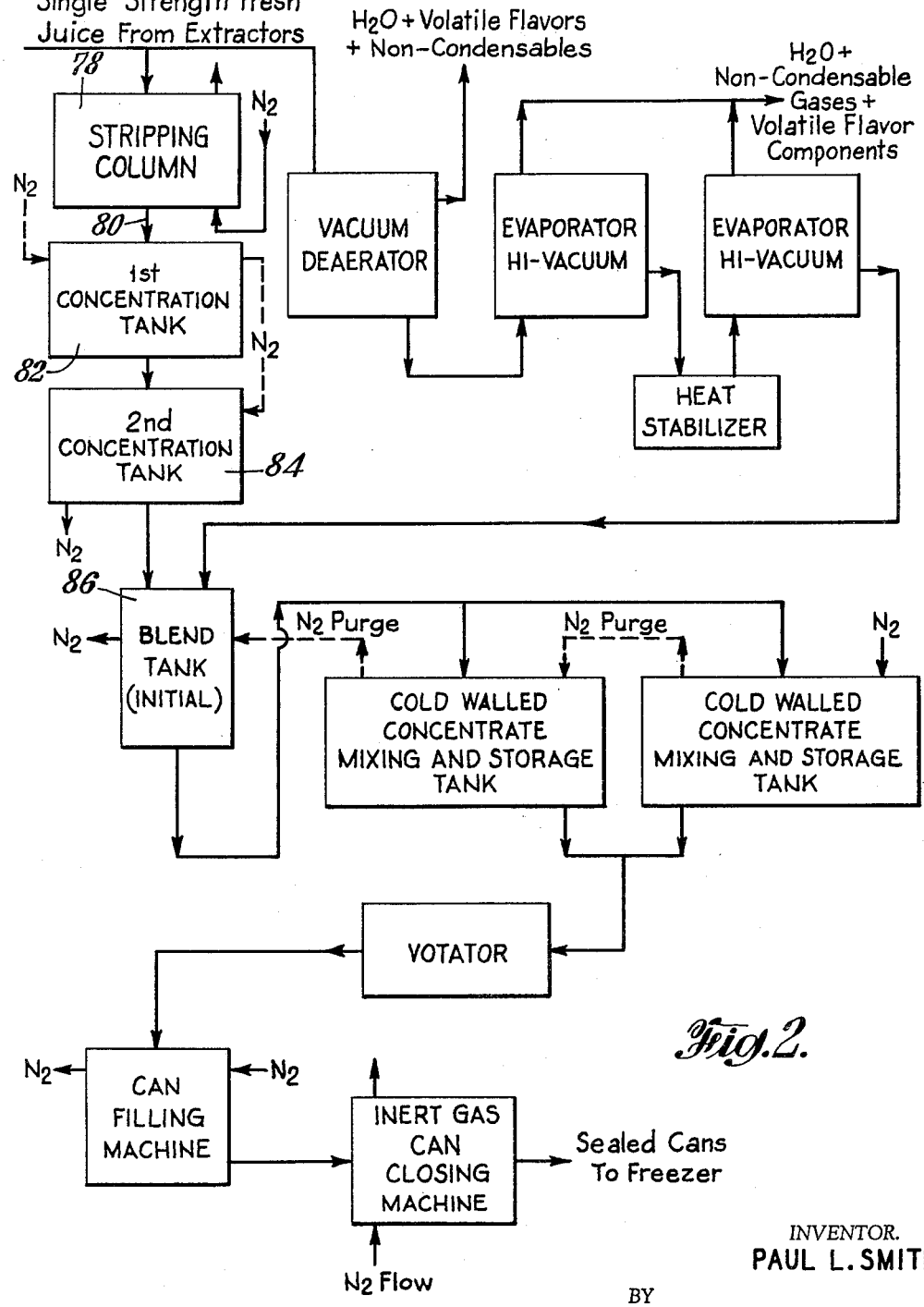

United States Patent Office 3,044,887
Patented July 17, 1962

3,044,887
METHOD OF CONCENTRATING FRUIT JUICE
Paul L. Smith, Winter Park, Fla., and Alfred L. Bayes, Riverside, Conn.; said Smith assignor to Union Carbide Corporation, a corporation of New York
Filed Mar. 30, 1959, Ser. No. 802,919
The terminal portion of the term of the patent subsequent to Nov. 3, 1976, has been disclaimed
5 Claims. (Cl. 99—205)

This invention relates to concentrated fruit juices and methods of producing the same.

This is a continuation-in-part of our earlier application Serial No. 676,546, filed August 6, 1957, now U.S. Patent No. 2,911,308.

The most important problem in preparation of fruit juices is that of retaining in the finished product as many of the pleasing qualities of the fresh juice as possible. The methods of preparation should be such that the original fresh fruit aroma and flavor are altered as little as possible. The natural flavor usually cannot be improved. The retention of nutritive values is also important. Fruit juices have been included in the diet largely as a source of water-soluble vitamins, and it is necessary that these not be destroyed during the preparation and preservation of the fruit juices.

Fruit juices generally deteriorate in color, flavor, and nutritive value on exposure to air. The rate of deterioration is quite rapid during stages of processing where high temperatures are employed. For this reason it is desirable to minimize exposure of the juice to air during extraction, straining and other treatment. Because of the presence of air, possibly in the inter-cellular spaces of the fruit, and because of the difficulty of extracting the juice without some aeration, the juice after extraction by conventional commercial techniques usually contains appreciable quantities of oxygen. This oxygen is conventionally removed from the juices, preferably as soon as possible, by vacuum deaeration methods. Such practice has been widely adopted in the commercial field of fruit juice processing.

Nitrogen stripping of the material to be treated and nitrogen purging of the processing equipment offer many advantages over vacuum deaeration for the removal of oxygen and protection of the material from subsequent contamination. Among these advantages are (1) minimum removal of desirable dissolved volatile constituents such as flavor essence and aroma, (2) protection of the material being treated after leaving the deoxygenation operation, and (3) lessening the time during which the material being treated is in contact with oxygen.

Conventionally fresh fruit juice is concentrated by high vacuum evaporation after or during which the juice is vacuum deaerated. A portion of single strength or specially processed concentrated juice is then added to the concentrate to restore flavor components. This specially processed concentrated juice has been heated so as to insure the retention by it of a substantial portion of its flavoring constituents. It has been found that a small proportion of such flavored or cut back juice is usually adequate to supply a marketable flavor to the blend of concentrate and cut back.

In the conventional process of extraction the natural juice becomes aerated. The cut back juice thus contains oxygen which contaminates the concentrate and detracts from its stability during storage.

It is an object of the present invention to remove the oxygen from the cut back juice which is added to restore the flavor quality to the juice which has been concentrated by vacuum evaporation.

It is a further object of this invention to provide a fruit juice concentration process in which the cut back juice is concentrated before blending with the concentrated juice while retaining a substantial proportion of the flavoring constituents in the cut back juice.

According to the present invention the oxygen is removed from the cut back juice by subjecting the same to a stripping operation by an inert gas such as nitrogen, prior to the blending with the concentrate. Preferably the blend is protected from pick up of oxygen in subsequent operation by a purging operation of the head space with inert gas. Other inert gases may be employed such as argon and helium. Carbon dioxide may also be used in cases where a carbonated flavor is not objectionable.

The cut back juice which has been subjected to inert gas stripping can also be concentrated under conditions which preserve its flavor constituents before being blended with the concentrated juice. The cut back juice is not ordinarily concentrated to the extent that the concentrated juice is.

In the drawings,

FIGURE 1 is a flow sheet of the juice from the extractors to the sealed cans; and FIGURE 2 is a flow sheet of the process of FIGURE 1 except that the stripped cut back juice is concentrated before blending with the concentrated juice.

In FIGURE 1, fresh single strength juice from the extractors and at ambient temperatures is supplied by a line 10. This juice contains for example 0.40 cc. oxygen and 3.2 cc. carbon dioxide per 100 grams of juice. The line 10 supplies the juice to a vacuum deaerator 12 which operates normally at a temperature of between 50° and 55° F.

From an exhaust line 14, water, non-condensable gases and volatile flavor components are taken off, and the residue containing for example 0.03 cc. oxygen and 0.30 cc. carbon dioxide per 100 grams of juice, passes through a line 16 to a high vacuum evaporator 18.

From an exhaust line 20, water, non-condensables and volatile flavors are taken off, and in the form shown, the residue passes through a line 22 to a heat stabilizer 24, and on to a second stage high vacuum evaporator 26. An exhaust line 28 joins the line 20 to take off the same kind of vapors. The residue of approximately 50 to 55 percent Brix concentrate is free of dissolved gases, for example oxygen or carbon dioxide, and passes through a line 30.

The line 30 delivers the concentrate to a blend tank 32, which also receives cut back juice through a line 34 from a stripping column 36. The column 36 receives single strength fresh juice from the extractors through a branch 38 from the main feed line 10.

Into the bottom of this stripping column 36 nitrogen gas is fed through a line 40 at for example 30 cubic feet per one thousand gallons of juice. This nitrogen removes oxygen and carbon dioxide from the cut back juice, the stripping nitrogen and entrained oxygen and carbon dioxide being all discharged through an exhaust line 42.

The nitrogen stripped cut back juice from the stripping column 36, passing through the line 34 to the blend tank 32, contains for example residual 0.02 cc. oxygen and 0.40 cc. carbon dioxide per 100 grams of juice. Being blended with the concentrate from the line 30, the blended product contains for example 0.01 cc. oxygen and 0.08 cc. carbon dioxide per 100 grams of blend, which blend is drawn off through a line 44.

The line 44 conducts the blend to cold walled concentrate mixing and storage tanks 46 and 48 having preferably less than 1 percent oxygen head space. Nitrogen purge at for example 50 cubic feet per hour is supplied by a line 50 to the tank 48 and passes through a line 52 to the tank 46 and on through a line 54 to the blend tank 32, from which the nitrogen purge and its entrainments are exhausted through a line 55.

The concentrate from the tanks 46 and 48 passes through a line 56 to a heater exchanger or votator 58, wherein it is further cooled, and on through a line 60 to a can filling machine 62 in which the concentrate is protected by nitrogen supplied by line 64 and exhausted by line 66. From the can filling maching the filled cans pass by conveyor 68 to the can closing machine 70, in which the concentrate is protected by nitrogen supplied by a line 72 and exhausted through a line 74.

From the can closing machine 70 the sealed cans pass to a freezer as at 76. The resultant head space contains for example oxygen 0.5 to 1.5 percent, nitrogen 98.5 to 99.5 percent. The juice analysis is for example oxygen 0.01 cc. and carbon dioxide 0.08 cc. per 100 grams.

In FIGURE 2, the process of FIGURE 1 is repeated except that the additional step of concentrating the cut back juice from stripping column 78 is added. The stripped single strength juice from stripping column 78 passes through line 80 to a first concentration tank 82. The juice is concentrated in tank 82, using special care to preserve the flavoring and other volatile constituents of the juice. One method of satisfactorily concentrating the juice is by lowering the temperature of the juice until ice crystals form therein and then removing such ice crystals. The cut back juice is not ordinarily concentrated as much as the concentrated juice from the high vacuum evaporators.

A second concentration tank 84 may be provided or the juice from tank 82 may be poured directly to blend tank 86, where it is mixed with the concentrated juice from the high vacuum evaporators.

The concentrated juice from the high vacuum evaporators is about 65° Brix whereas the cut back juice from the stripping column is about 28° Brix in concentration.

To determine the effectiveness of stripping oxygen from fruit juices by an inert gas as compared with the conventional method of removal by vacuum deaeration, a series of tests were conducted in which various samples were deaerated and stripped and analyses were made of the resulting products. Nitrogen was used as the stripping gas.

Distilled water was aerated and a known quantity of propionaldehyde, a constituent of apple juice (boiling point, 11.8° F.), was added as a representative low-boiling essence material. Oxygen was then removed from the samples by vacuum deaeration and nitrogen stripping. Off-gases from the deaeration apparatus were passed through liquid nitrogen traps to effect total condensate recovery. Oxygen removal is indicated in Table 1.

TABLE 1

| Run | Method | Temp., °F. | Original Dissolved $O_2$ in cc. per 100 cc. of liquid | Original Propionaldehyde p.p.m. | Oxygen Removal in Percent | Loss of Water, Percent | Loss of Propionaldehyde, Percent |
| --- | --- | --- | --- | --- | --- | --- | --- |
| 1 | Vacuum | 104 | 0.42 | 35 | 55 | 1.6 | 5 |
| 2 | do | 104 | 0.38 | 140 | 58 | 1.6 | 8 |
| 3 | Nitrogen | 77 | 0.54 | 150 | 94 | 0.01 | 0.04 |

In runs 1 and 2, 55% and 58%, respectively, of the oxygen content was removed, but there was also a high loss of water content and propionaldehyde. By employing nitrogen stripping in run 3, 94% of the oxygen was removed with a loss of only 0.01% of water and 0.04% of propionaldehyde.

Under the conditions employed at least 3 percent of the water would have to be vaporized to effect 90 percent removal of oxygen by the vacuum method. This would result in a 10 to 15 percent loss of essence materials having volatilities comparable to that of propionaldehyde. In contrast to this, only negligible amounts of essence are removed by nitrogen stripping.

As a further example of the superiority of nitrogen stripping over vacuum deaeration, a quantity of fresh orange juice was separated into two portions and treated by vacuum deaeration and nitrogen stripping. Distillates were collected in cold traps and compared with respect to quantity and flavor.

The results are shown in Table 2.

Table 2

| Method | Temp., °F. | Oxygen Removal, percent | Condensate Loss, percent |
| --- | --- | --- | --- |
| Vacuum deaeration | 104 | 77 | 1.8 |
| Nitrogen stripping | 77 | 100 | 0.002 |

From Table 2 it can be seen that with nitrogen stripping of the orange juice, the oxygen in the juice can be removed with a negligible loss of condensable materials. On the other hand with only 77% of the oxygen removed using the vacuum deaeration techniques, considerable quantities of condensable materials are lost.

The juice processed according to these teachings has superior flavor and stability as compared with conventional juices which contain oxygen or are treated so as to result in the loss of appreciable amounts of flavoring constituents.

What is claimed is:

1. A process for the preparation of a concentrated fruit juice which comprises separating juice from fruit, concentrating a first portion of said juice by removing water therefrom, concentrating a second portion of said juice by removing water therefrom while retaining the volatile fraction of said juice, subjecting said second portion of said juice to a stripping operation wherein an inert gas is passed through said juice so as to preferentially displace at least a portion of oxygen present in said juice, protecting said first portion of juice from contamination with oxygen by maintaining said first portion in a non-oxidizing atmosphere, protecting said second portion of juice which has been subjected to said stripping operation from contamination by maintaining said second portion in a non-oxidizing atmosphere, combining said first and second portions of said juice, and storing said combined portions under non-oxidizing conditions.

2. A process for the preparation of a concentrated fruit juice which comprises separating juice from fruit, concentrating a first portion of said juice by evaporating water therefrom while subjecting said juice to a pressure less than atmospheric, concentrating a second portion of said juice by freezing water therein and removing the ice formed by said freezing from said juice, subjecting said second portion of said juice to a stripping operation wherein an inert gas is passed through said juice so as to preferentially displace at least a portion of oxygen present in said juice, protecting said first and second portions of said juice from contamination by maintaining said portions in a non-oxidizing atmosphere, combining said first and second portions of said juice, and placing said combined portions in a sealed container.

3. A process for the preparation of a concentrated fruit juice which comprises separating juice from fruit, concentrating a first portion of said juice by removing water therefrom, subjecting a second portion of said juice to a stripping operation wherein nitrogen is passed through said juice so as to preferentially displace at least a portion of oxygen present in said juice, concentrating said second portion of said juice by freezing water therein and removing the ice formed thereby from said juice, protecting said first and second portions of said juice from contamination by maintaining said portions in a non-oxidizing atmosphere, combining said first and second portions of said juice, and placing said combined portions in a sealed container while continuing the protection of said juice by maintaining said juice in a non-oxidizing atmosphere.

4. In a process for the preparation of a concentrated fruit juice which comprises separating juice from fruit, concentrating a first portion of said juice by removing water therefrom, subjecting a second portion of said juice to a stripping operation wherein an inert gas is passed through said juice so as to preferentially displace at least a portion of oxygen present in said juice, protecting said first and second portions of said juice from contamination by maintaining said portions in a non-oxidizing atmosphere, combining said first and second portions of said juice, and placing said combined portions in a sealed container, the improvement comprising concentrating said second portion of said fruit juice by removing water therefrom while retaining the volatile fraction of said juice.

5. In a process for the preparation of a concentrated fruit juice which comprises separating juice from fruit, concentrating a first portion of said juice by removing water therefrom, subjecting a second portion of said juice to stripping operation wherein an inert gas is passed through said juice so as to preferentially displace at least a portion of oxygen present in said juice, protecting said first and second portions of said juice from contamination by maintaining said portions in a non-oxidizing atmosphere, combining said first and second portions of said juice, and placing said combined portions in a sealed container, the improvement comprising concentrating said second portion of said fruit juice by freezing water therein and removing the ice formed thereby from said juice.

References Cited in the file of this patent

UNITED STATES PATENTS

| | | |
|---|---|---|
| 2,047,935 | Beal et al. | July 21, 1936 |
| 2,301,901 | McKinnis | Nov. 10, 1942 |
| 2,333,898 | Stevenson et al. | Nov. 9, 1943 |
| 2,453,109 | MacDowell et al. | Nov. 9, 1948 |
| 2,457,315 | Milleville | Dec. 28, 1948 |
| 2,903,371 | Toulmin | Sept. 8, 1959 |
| 2,911,308 | Smith | Nov. 3, 1959 |

OTHER REFERENCES

Food Technology, April 1950, article entitled "Investigations on Use of Nitrogen for Stabilization of Perishable Food Products," by A. L. Bayes, pages 2–8.